Oct. 22, 1963     D. GEORGETTE     3,107,753
PNEUMATIC MOTION REGULATOR

Filed Feb. 24, 1961     2 Sheets-Sheet 1

INVENTOR.
DANIEL GEORGETTE
BY
ATTORNEY

Oct. 22, 1963   D. GEORGETTE   3,107,753
PNEUMATIC MOTION REGULATOR
Filed Feb. 24, 1961   2 Sheets-Sheet 2

INVENTOR.
DANIEL GEORGETTE
BY
ATTORNEY 3,107,753
PNEUMATIC MOTION REGULATOR
Daniel Georgette, 9401 Crenshaw Blvd.,
Inglewood, Calif.
Filed Feb. 24, 1961, Ser. No. 91,439
3 Claims. (Cl. 188—94)

This invention pertains to a device for controlling the motion of a driven member.

Conventional motion controlling devices usually constitute some form of hydraulic unit such as a variation of the familiar hydraulic dash pot. These units generally are somewhat expensive to manufacture, requiring many machined parts that must be held to close tolerances. The use of hydraulic fluid necessitates a reservoir in many instances, and creates problems from heating where the motion is continuous or often repeated. Leakage in the system results in malfunction and causes a continual maintenance problem. Furthermore, there frequently is difficulty in accurately regulating the motion of the driven member within any kind of close limits. In addition, hydraulic motion regulators are unsatisfactory for high speed operation due to chattering that occurs under such conditions.

The present invention overcomes the difficulties of the prior art by a provision of a pneumatic unit in which movement of a piston is controlled by air passing through adjustable restricted metering passageways. If desired, where operation is continual or repeated, ambient air may be drawn into the system to prevent overheating. In one version of the invention, two-speed motion is permitted for the piston and shock loads are absorbed through the provision of a spring loaded valve at the metering orifice that increases the size of the opening in response to higher pressure.

Therefore, it is an object of this invention to provide a low cost, reliable and versatile motion regulating device.

Another object of this invention is to provide a motion regulating device adapted for pneumatic operation, obviating the requirement for closely machined parts, reservoirs and the like.

A further object of this invention is to provide a motion regulating device adjustable to control the amount of resistance offered, and to compensate for any wear in the unit.

An additional object of this invention is to provide a motion regulating device operable at high speed.

These and other objects will become apparent from the following detailed description taken in connection with the accompanying drawing in which.

Figure 1:
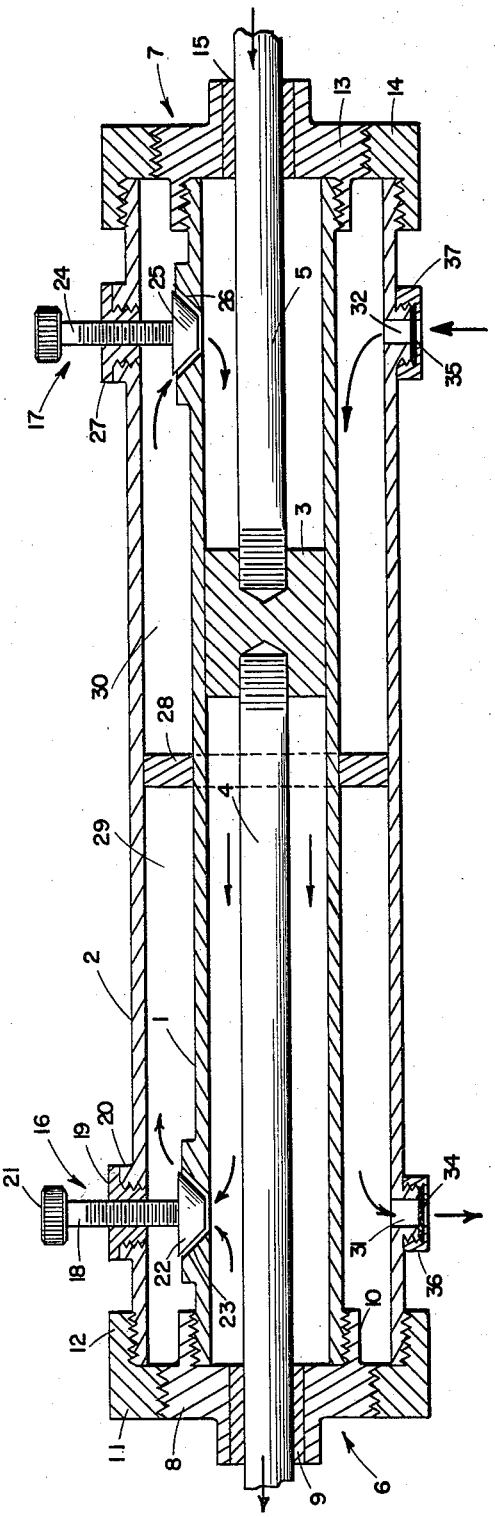
FIG. 1 is a longitudinal sectional view of the design of this invention.

With particular reference to FIG. 1, the design of this invention includes a duality of concentric cylinders 1 and 2. A piston 3 is reciprocative within cylinder 1, and threadably receives piston rods 4 and 5 at its axis. If desired, of course, only a single rod may be connected to the piston.

The cylinder head assemblies 6 and 7 are of identical construction. Thus unit 6 includes an inner member 8 that supports a bushing 9 through which the piston rod extends. The member 8 also has an internally threaded portion 10 that threadably receives the exterior end portion of the cylinder 1. External threads are provided around the circumference of member 8 which connect to mating threads on the additional cylinder head member 11. The latter section of the cylinder head includes an internally threaded portion 12, generally similar to portion 10 of the member 8, connecting to the outer cylinder 2.

Similarly, the cylinder head assembly 7 is made up of elements 13 and 14 that support bearing 15 and connect to the ends of the two concentric cylinders.

This type of cylinder head design is particularly simple to construct, yet effectively secures and positions the two concentric cylinders 1 and 2.

Valve units 16 and 17 are disposed at the two opposite ends of the cylinder assembly. The valve 16 includes a stem 18 threadably received within a central aperture through nut 19, which in turn is threadably connected to a boss 20 in the exterior cylinder 2. A knurled head 21 is included at the top end of stem 1 to facilitate rotational movement of it from the exterior of the cylinder assembly. The bottom part of the valve stem extends into the space between the two cylinders, and includes frustoconical valve element 22 at its lower end. The latter is arranged to cooperate with complementary valve seat 23 which defines an opening through the wall of the inner cylinder 1.

Valve unit 17 is identical to the valve assembly 16 including a valve stem 24 carrying valve member 25 at the passageway 26 through the wall of the inner cylinder 1. The valve stem 24 passes through nut 27 which, in turn, is threadably received in the wall of the outer cylinder 2.

A continuous annular member 28 is included at the center of the cylinder assembly, dividing the space between the two cylinders into a duality of chambers 29 and 30.

Passageways 31 and 32 extend through the outer cylinder 2 providing communication to the exterior of the unit from the two chambers 29 and 30, respectively. These passageways are larger than those resulting at the valve units, and provide substantially no restriction to the movement of air between the chambers 29 and 30 and the outside of cylinder 2. Preferably, fine mesh screens 34 and 35, or other suitable filtering arrangements, are included at the passageways 31 and 32 so that only clean air will be drawn into the cylinders. These screens may be held in place by means of fittings 36 and 37 that threadably connect to embossments 38 and 39 on the outer cylinder 2 at the locations of the passageways.

As an example of the operation of the arrangement of FIG. 1, motion may be imparted to piston rod 4 or 5, or to both of the rods, urging the piston 3 to the left. In response to this, air will be displaced from the area to the left of piston 3, being forced outwardly through the valve passageway 23 into the chamber 29. The position of valve member 22 with respect to the valve seat determines the size of the opening into chamber 29, and the valve unit defines a restricted passageway offering a resistance to the movement of the air. The air which enters the chamber 29 exhausts to the exterior of the device through passageway 31.

As the piston moves to the left, air is received in the space on the right-hand side of the piston by being drawn through valve passageway 26 and chamber 30. Chamber 30 is supplied with ambient air through the passageway 32. Thus, while air moves in one direction through the valve on the left side of the piston, it flows in the opposite direction on the right-hand side as it enters that portion of the cylinder 1. This air movement is indicated by the arrows in FIG. 1.

Should the movement of piston 3 be reversed, the exactly opposite effect will occur. In other words, movement of the piston 3 to the right will displace air from cylinder 1 out through valve opening 26 and passageway 32. At the same time, a fresh supply of air is drawn in through passageway 31 and the restricted passageway 23 to the left-hand part of the cylinder 1.

As a result of this arrangement it is possible to closely control the amount of resisting force that the unit offers simply by appropriate positioning of the valve units 16 and 17 to govern the size of the restricted passageways from cylinder 1. The device operates equally well upon movement of piston 3 in either direction. Overheating never occurs, because as air is compressed and forced from the cylinder 1 on one side of the piston, thereby becoming heated as a result of the energy imparted to it, the heat is dissipated as this air is forced outwardly to the exterior of the device. Continued reciprocative movement of the piston 3 always serves to draw fresh cool air into the portion of the chamber away from which the piston is moving. Thus, not only is the expense of a hydraulic system avoided, but the problem of overheating is entirely obviated.

In the event that wear occurs in the system, a simple adjustment of the valves 16 and 17 will compensate for the wear by controlling the size of the restricted valve passageways. If a small quantity of air should leak around the periphery of piston 3 due to wear of the parts, adjustment of the valves to reduce the dimensions of the restricted passages will cause the unit to offer the same resistance as before. Hence, even after long periods of use it is possible to maintain precisely the desired amount of resistance to the movement of the piston rods. The use of pneumatic fluid as the resisting medium permits high speed operation without chattering, as well as removing any possibility of overheating, as discussed above. The inclusion of two concentric cylinders not only offers great simplicity of construction, but effectively protects the components of the unit by locating the valve elements in the interior of the outer cylinder, and assures that the incoming air may be filtered through the screen in the passageway through the outer cylinder.

Figure 2:
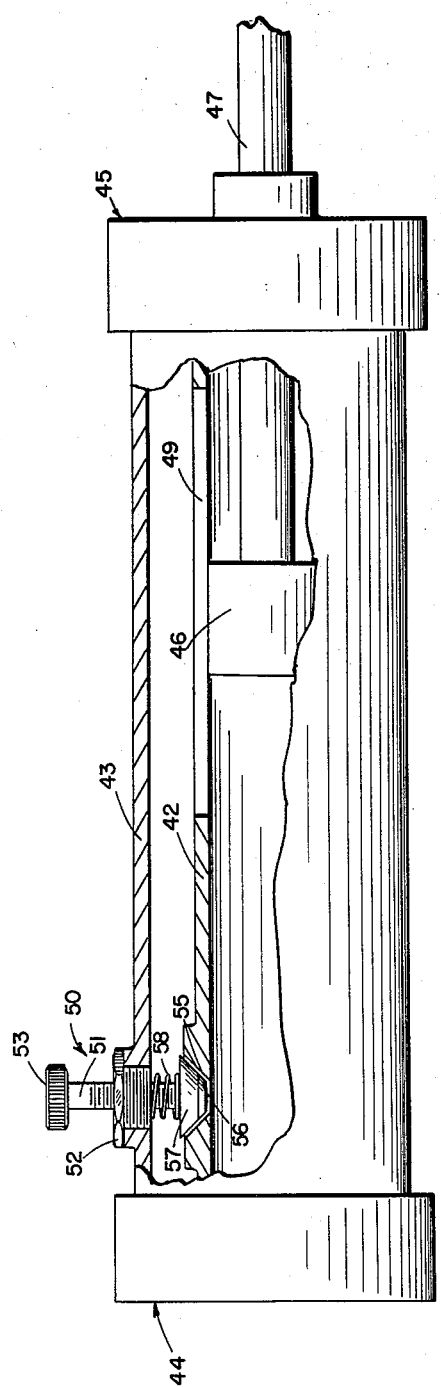
FIG. 2 is an elevational view, partially in section, of a modification of the invention for two-speed movement.
Figure 3:
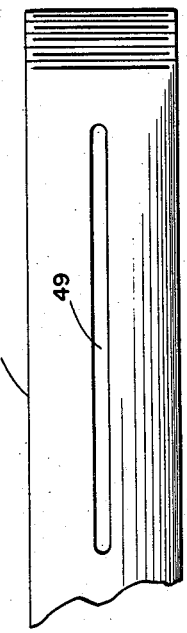
FIG. 3 is a top plan view of the inner cylinder of the unit of FIG. 1 illustrating the bypass slot.
Figure 4:
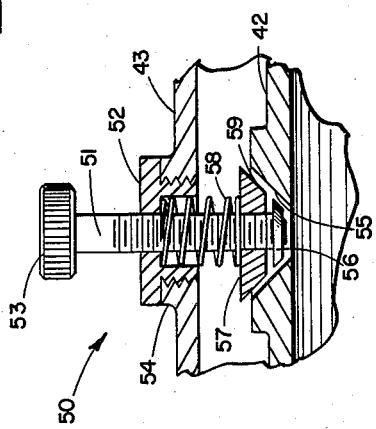
FIG. 4 is an enlarged fragmentary view of the adjustable metering valve showing the provision for absorbing shock loads.

The arrangement of FIGS. 2, 3 and 4, which permits two different speeds for the piston rod, includes an inner cylinder 42 and outer cylinder 43 concentric therewith. Cylinder head assemblies 44 and 45 may be substantially the same as the cylinder heads 6 and 7 described in detail above. Reciprocative within the inner cylinder 42 is a piston 46, actuated by a piston rod 47. One rod is illustrated in FIG. 2 but it would be possible to include two piston rods as in the previously described arrangement, should this be desired.

Extending for a portion of the length of inner cylinder 42 is an axial slot 49 through the wall of this cylinder.

At the left end of the cylinder assembly is a valve unit 50 which may include valve stem 51 threadably received in an aperture through nut 52, and rotatable from the exterior by means of knurled head 53. The nut 52 is secured within boss 54 in the wall of the outer cylinder 43.

The inner end of valve stem 51 extends toward frustoconical valve passageway 55 through the wall of cylinder 42. However, the valve member for cooperation with the valve seat 55 is in two sections, with only the relatively small end portion 56 integrally attached to the valve stem 51. The remaining and larger section 57 is annular in form and normally rests on the upper surface of element 56, but is separate from the valve stem and axially slidable relative thereto. A spring 58 is received with an appropriate recess in nut 52 at one end, and at the other bears against the valve member 57 urging it to its normal position against end section 56 of the valve stem unit.

As a result of this construction, if the piston 46 is moved toward the left in the cylinder 42, it initially meets with virtually no resistance due to slot 49 which allows the air to bypass the piston as the piston moves. However, immediately after the piston passes the limit of slot 49 there is no path for the fluid to the left of the piston other than that through restricted passageway 55 and from thence to the slot 49. Thus, suddenly as the piston reaches a certain point in its travel as determined by the length and positioning of slot 49, a considerable resistance is generated against further piston movement. The degree of resistance, of course, can be controlled by the setting given the valve at passageway 55.

The provision of the separate slidable portion 57 of the valve unit allows the regulator of this invention to absorb shock loads, and prevents damage from too abrupt an application of the greatly increased resisting force. This occurs because as the air pressure builds up to the left of the piston after it passes the length of slot 49, the initial surge of pressure will react against the under surface 59 of element 57, sliding this member upwardly relative to the valve stem, as indicated in FIG. 4. This reduces the amount of resistance found in passageway 55 so that so long as the element 57 is in the upper position, air can pass through the valve passageway more readily than otherwise and the resisting force on piston 46 is reduced. The amount of reduction pressure to the left of the piston can be controlled by selection of the force of spring 58, as well as the proportioning of the elements 56 and 57 within the valve passageway.

Following the pressure surge the spring 58 forces member 57 back against end segment 56 to offer the full resisting force as the piston continues its movement. The fixed position of the valve stem assures that the setting will be maintained despite the movement of the annular member 57.

Return movement of piston 46 to the right will find a relatively high resistance initially as the air must be drawn through passageway 55 to the portion of the cylinder vacated by the piston, but after a short distance when the slot 49 is contacted, air again bypasses freely and there is virtually no restriction to continued movement of the piston.

Thus, as in the previously described embodiment, the arrangement for dual velocities maintains the advantages of simplicity, reliability, versatility and economy. Where the frequency of operation justifies it, there may be provided an additional aperture through the outer cylinder 43 similar to openings 31 and 32 in the arrangement of FIG. 1. This will permit the introduction of ambient air, preventing overheating of the unit. For intermittent operation, however, the unit may be sealed, as shown, and the air recirculated.

The foregoing detailed description is to be clearly understood as given by way of illustration and example only, the spirit and scope of this invention being limited solely by the appended claims.

I claim:
1. A motion regulating device comprising
a duality of concentric cylinders,
a piston reciprocative through a stroke in the inner one of said cylinders,
    the circumferential wall of said inner cylinder having an elongated axially extending slot therein providing free communication on either side of said piston during a portion of the stroke thereof,
and restricted passage means for said inner cylinder in the circumferential wall thereof remote from said slot,
    said restricted passage means including a radial opening defined by an outwardly flaring frustoconical wall,
    and a restrictor means for association with said opening and restricting the communication therethrough,
        said restrictor means having a stem axially aligned with said opening, one end of said stem threadably extending through the wall of the outer one of said cylinders, whereby said stem is exteriorly rotatable and upon rotation thereof said stem is advanced to or moved away from said opening, a first radially enlarged disc fixed on the opposite end of said stem in said opening, a second disc slidably received on said stem inwardly of said first disc, said first and second discs together defining a frustoconical member substantially complementary to said frustoconical wall, and a coil spring interposed between said wall of said outer cylinder and said second disc for biasing said second disc to a position of normal engagement with said first disc element, whereby upon exertion of fluid pressure within said first cylinder sufficient to overcome the force of said spring, said second disc element is movable relative to said stem to a position spaced from said first disc element for thereby reducing the restriction in said opening.

2. A motion regulating device comprising a duality of concentric cylinders, a piston reciprocative in the inner one of said cylinders, a portion of the wall of said inner cylinder having an axial slot therein for providing a bypass from one side of said piston to the other, and restricted passage means through said wall of said inner cylinder remote from said slot for providing a passageway for fluid out of said inner cylinder in response to movement of said piston when said piston is remote from said slot, said wall of said inner cylinder including an aperture therethrough for defining a fluid passageway for said restricted passage means, said restricted passage means including an adjustable member for controlling the size of the passageway through said wall, and a pressure-responsive member in said passageway for restricting the same, said adjustable member being a movable member having a stem threadably received in the wall of the outer of said cylinders, and an enlarged end section in said aperture, said pressure-responsive member being a spring pressed member on said stem biased to a normal position engaging said end section and constricting said aperture, and having a surface for contact with fluid in said aperture such that such fluid urges said pressure responsive member to a position away from said aperture for reducing the amount of constriction therein.

3. A motion regulating device comprising a duality of concentric cylinders, a piston reciprocative in the inner one of said cylinders, a portion of the wall of said inner cylinder having an axial slot therein for providing a bypass from one side of said piston to the other, and restricted passage means through said wall of said inner cylinder remote from said slot for providing a passageway for fluid out of said inner cylinder in response to movement of said piston when said piston is remote from said slot, said wall of said inner cylinder including a substantially frustoconical outwardly flaring opening therethrough for defining fluid passageway for said restricted passage means, said restricted passage means including an adjustable member for controlling the size of said passageway through said wall, and a pressure-responsive member in said passageway for restricting the same, said adjustable member including a stem threadably received in the wall of said outer cylinder, one end of said stem projecting through said wall for operation exteriorly thereof, and the other end of said stem including a radially enlarged section, said pressure-responsive member including an annular member slidably received on the inner end of said stem adjacent said opening in said wall of said inner cylinder, and a spring biasing said annular member toward said radially enlarged section, said annular member in response to fluid pressure in said opening being movable away from said opening against the force of said spring for reducing the restriction formed by said annular member upon increase of pressure in said cylinder.

References Cited in the file of this patent
UNITED STATES PATENTS

| | | |
|---|---|---|
| 1,160,976 | Myers | Nov. 16, 1915 |
| 1,267,742 | Bulley | May 28, 1918 |
| 1,313,763 | Thomas | Aug. 19, 1919 |
| 1,765,314 | Stuart | June 17, 1930 |
| 1,869,604 | McWhirter | Aug. 2, 1932 |
| 2,730,201 | Melzer | Jan. 10, 1956 |
| 2,911,010 | Lamburn | Nov. 3, 1959 |
| 2,971,212 | Voster et al. | Feb. 14, 1961 |